United States Patent
Hofmann et al.

(10) Patent No.: US 7,819,589 B2
(45) Date of Patent: Oct. 26, 2010

(54) RADIAL ROLLER BEARING, IN PARTICULAR A SINGLE-GROOVE GROOVED BALL BEARING

(75) Inventors: Heinrich Hofmann, Schweinfurt (DE); Horst Doeppling, Herzogenaurach (DE); Robert Plank, Weisendorf (DE)

(73) Assignee: Schaeffler KG, Herzogenaurach (DE)

( * ) Notice: Subject to any disclaimer, the term of this patent is extended or adjusted under 35 U.S.C. 154(b) by 485 days.

(21) Appl. No.: 11/910,073

(22) PCT Filed: Mar. 9, 2006

(86) PCT No.: PCT/DE2006/000424
§ 371 (c)(1),
(2), (4) Date: Oct. 19, 2007

(87) PCT Pub. No.: WO2006/102863
PCT Pub. Date: Oct. 5, 2006

(65) Prior Publication Data
US 2008/0212912 A1 Sep. 4, 2008

(30) Foreign Application Priority Data
Mar. 31, 2005 (DE) .................. 10 2005 014 556

(51) Int. Cl.
*F16C 33/32* (2006.01)
*F16C 43/06* (2006.01)
*F16C 19/50* (2006.01)

(52) U.S. Cl. .............. 384/568; 384/447; 384/510; 384/619

(58) Field of Classification Search ............... 384/457, 384/491, 510, 567–568, 447, 619
See application file for complete search history.

(56) References Cited

U.S. PATENT DOCUMENTS

| | | | |
|---|---|---|---|
| 1,301,527 A * | 4/1919 | Weibull | 384/568 |
| 1,622,985 A * | 3/1927 | Weibull | 384/567 |
| 1,766,440 A * | 6/1930 | Leon | 384/558 |

(Continued)

FOREIGN PATENT DOCUMENTS

| | | | |
|---|---|---|---|
| DE | 168499 A | | 2/1903 |
| DE | 88755 | * | 6/1922 |
| DE | 4334195 A | | 3/1994 |
| GB | 138386 A | | 2/1920 |
| GB | 249806 | * | 5/1926 |

*Primary Examiner*—Marcus Charles
(74) *Attorney, Agent, or Firm*—Lucas & Mercanti, LLP

(57) ABSTRACT

A radial roller bearing, which is a single-grooved ball bearing. The bearing bodies are spherical disks with two symmetrical, parallel lateral surfaces from a spherical base shape. The bearing has a larger contact surface of the spherical disk in relation to the bearing body tracks thereof, as well as, an increased number of bearing bodies. One part of the width of the disks, between the lateral surfaces thereof, is larger than the distance between the inner side of the external bearing ring and the external side of the inner bearing ring, but equal to or smaller than the width of the bearing body tracks. Also, the use of the disks in the bearing takes place according to an eccentric mounting method where the disks are arranged in a transversal manner in the bearing body tracks and are arranged on top of each other in relation to the lateral surfaces thereof.

3 Claims, 2 Drawing Sheets

U.S. PATENT DOCUMENTS 2,695,204 A * 11/1954 Matera ....................... 384/457
3,620,585 A * 11/1971 Anderson et al. ........... 384/491
4,741,632 A *  5/1988 Jacobson ................... 384/491
6,575,631 B2 *  6/2003 Shoda et al. ................. 384/447
6,752,696 B2 *  6/2004 Murai et al. .................. 451/49
2005/0117827 A1 *  6/2005 Fujii et al. .................. 384/510

* cited by examiner

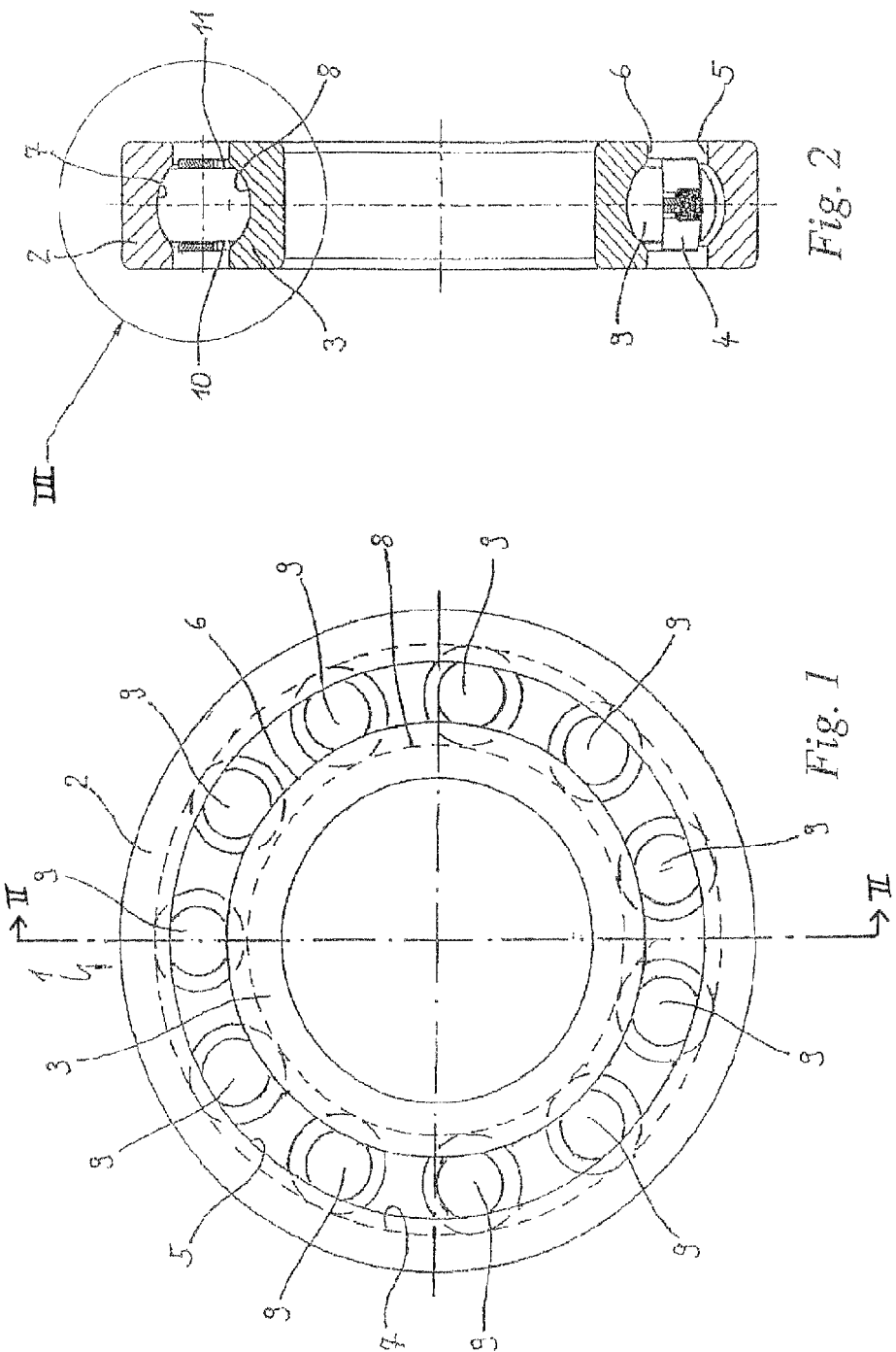

US 7,819,589 B2

RADIAL ROLLER BEARING, IN PARTICULAR A SINGLE-GROOVE GROOVED BALL BEARING

FIELD OF THE INVENTION

The invention relates to a radial rolling bearing according to the features of patent claim 1 which forms the preamble, and it can be implemented particularly advantageously on a single-row grooved ball bearing which is used, for example, as a fixed bearing in a motor vehicle shift transmission.

BACKGROUND OF THE INVENTION

It is generally known to a person skilled in the art of rolling bearings that single-row grooved ball bearings are rigid undismountable radial rolling bearings which are distinguished, above all, in that their radial and axial load-bearing capacity is equally high, and that, because of their low friction, they have the highest rotational speed limits of all types of bearing. These grooved ball bearings have been known for a long time and consist essentially of an outer bearing ring and of an inner bearing ring and also of a number of balls arranged as rolling bodies between the bearing rings. Into the inside of the outer bearing ring and into the outside of the inner bearing ring, respectively, groove-shaped ball raceways are machined in which raceways the balls are guided in a bearing cage at uniform distance to each other. Radial ball bearings are filled with the balls by means of the eccentric mounting method which became known from DE 168 499 and in which the two bearing rings are arranged eccentrically to one another, and the free space occurring as a result between the bearing rings is filled with the balls. The size and number of the balls are dimensioned according to the bearing size such that the inner bearing ring between the first and the last ball can be brought, using the elasticity of the two bearing rings, into the position concentric with respect to the outer bearing ring, so that the balls can finally be distributed at a uniform distance from one another on the reference circle of the two ball raceways and the bearing cage can be inserted.

It became apparent in practice, however, that grooved ball bearings of this type nevertheless have defined limits in terms of the load-bearing capacity of the bearing because of the small maximum installable number of balls which depends on the dimensions of the inner and of the outer bearing ring and also on the ball diameter. In the past, therefore, a multiplicity of solutions were proposed, by means of which an increase in the load-bearing capacity of grooved ball bearings was to be achieved by means of an increase in the number of balls.

Thus, for example, it has already been proposed by DE 151 483 to arrange on one side of the grooved ball bearing, in the mutually opposite rims of the outer and of the inner bearing ring, a clearance as a filling orifice, which corresponds to the shape of the balls and through which the balls can be introduced into the bearing without interspaces with respect to one another and can be distributed. However, as a rule, this filling orifice remains unsealed and therefore has the disadvantage that the balls always have to run past this filling orifice during operation. Particularly in grooved ball bearings, in which the filling orifice then issues in the form of a wedge into the raceways of the balls, however, the result of this is that a "catching" or jamming of the rolling bodies at this filling orifice may occur, particularly, when axial forces press the balls against the rims of the bearing which are provided with the filling orifice.

Even the solution, disclosed by DE 24 07 477 A1, to reclose the filling orifice in the rims of the bearing rings, after the filling of the rolling bearing with the rolling bodies, in such a way that the closing pieces, broken out of the rims of the bearing rings beforehand via a milled predetermined breaking notch are inserted into the rims again by adhesive bonding or welding, has not proven appropriate, in practice, since, by the closing pieces being adhesively bonded or welded, adverse burrs or adhesive surpluses are formed on the rim guide surface and may cause, as before, such a "catching" of the rolling bodies. Furthermore, the connection point of the closing pieces always constitutes with respect to the remaining rim a weak point in terms of their strength, so that rolling bearings of this type can be subjected to only a limited axial load in one direction at least.

Another possibility for increasing the number of rolling bodies on a radial rolling bearing became known, furthermore, from DE 43 34 195 A1. In this radial rolling bearing designed per se as a single-row grooved ball bearing, however, the rolling bodies are not formed by balls, but, instead, either partially or completely by what are known as spherical disks which are designed with two side faces flattened symmetrically from a basic spherical shape and arranged parallel to one another. The width of these spherical disks between their side faces is smaller than the distance between the inside of the outer bearing ring and the outside of the inner bearing ring, so that, when the bearing is being filled, the spherical disks can be introduced into the bearing axially with respect to the bearing through the clearance between the inner ring and outer ring. When the center point of the spherical disks is then located level with the rolling body raceway axis, the spherical disks are rotated by 90°, so that they can roll with their spherical surfaces in the rolling body raceways.

Despite the possibility of inserting the specially designed spherical disks axially into the bearing and therefore being able to fill the radial rolling bearing almost completely with a high number of rolling bodies, such a radial rolling bearing is nevertheless, at most, only a compromise in terms of the desired increase in load-bearing capacity of the bearing. This is because the spherical disks, on account of their capability of axial introduction into the bearing, have only a correspondingly narrow design or a design with a correspondingly small width between their side faces, so that they can easily be introduced into the bearing through the clearance between the inner ring and outer ring. Likewise, the rolling body raceways in the bearing rings can have only a relatively shallow and narrow design, so that the rotation of the rolling bodies into their operating position can be made possible, without too high a radial play in the overall bearing occurring in this operating position. However, the relatively narrow spherical disks and the shallow rolling body raceways give rise to a relatively small contact area of the spherical disks with their rolling body raceways, so that both the axial and the radial load-bearing capacity of such a radial bearing is again reduced and the original advantage of the increased number of rolling bodies is virtually compensated.

OBJECT OF THE INVENTION

Preceding from the outlined disadvantages of the solutions of the known prior art, therefore, the object on which the invention is based is to design a radial rolling bearing, in particular, a single-row grooved ball bearing, which is designed with spherical disks as rolling bodies and has a markedly increased load-bearing capacity, as compared with conventional grooved ball bearings with balls or known radial rolling bearings with spherical disks.

DESCRIPTION OF THE INVENTION

According to the invention, the object is achieved in that the radial rolling bearing has both an enlarged contact area of the spherical disks with their rolling body raceways and an increased number of rolling bodies, in that, on the one hand, the width of the spherical disks between their side faces is designed to be greater than the distance between the inside of the outer bearing ring and the outside of the inner bearing ring, but equal to or smaller than the width of the groove-shaped rolling body raceways, and, on the other hand, the insertion of the spherical disks into the radial rolling bearing takes place by the eccentric mounting method, in which the two bearing rings are arranged eccentrically to one another and the spherical disks are inserted, with their side faces bearing against one another, into the free space between the bearing rings, transversely into the rolling body raceways. After the bearing has been filled with the spherical disks, the inner bearing ring is then brought, using the elasticity of the two bearing rings, into the concentric position with respect to the outer bearing ring, so that the spherical disks can be distributed at a uniform distance from one another on the reference circle of the two ball raceways and he pivoted by 90°, and, finally, the bearing cage can be inserted into the bearing.

Preferred refinements and developments of the radial rolling bearing designed according to the invention are described below.

According to one preferred embodiment of the radial rolling bearing design the width of the spherical disks between their side faces to amount to at least 70% and for the distance between the inside of the outer bearing ring and the outside of the inner bearing ring to amount to only about 64% of the diameter of the basic spherical shape of the spherical disks. A width of the spherical disks of 70% of their basic spherical shape has proved appropriate, in practice, in terms of the radial and axial load-bearing capacity of the bearing and corresponds approximately to the contact area which the balls of conventional grooved ball bearings have with their raceways in the bearing rings. However, since not only the size of the contact area, but also the number of the rolling bodies have an influence on the load-bearing capacity of the bearing, the design of the spherical disks with a width of 70% of their basic spherical shape constitutes in this respect an optimum, since it is basically true that, the wider the spherical disks are made, the larger their contact area with the rolling body raceways becomes, but the smaller the number of spherical disks insertable into the bearing by the eccentric mounting method also becomes. By designing the distance between the inside of the outer bearing ring and the outside of the inner bearing ring to be only 64% of the basic spherical shape of the spherical disks, it is achieved furthermore that the rolling body raceways of the spherical disks in the bearing rings have correspondingly high shoulders.

Furthermore, according to additional preferred embodiments, the depth of the rolling body raceway on the outer bearing ring amounts to about 17% and the depth of the rolling body raceway on the inner bearing ring to about 199°, of the diameter of the basic spherical shape of the spherical disks, while the width of the rolling body raceway on the outer bearing ring amounts to about 75% and the width of the rolling body raceway on the inner bearing ring to about 78% of the diameter of the basic spherical shape of the spherical disks. The design of the rolling body raceways with such dimensions corresponds likewise to the experience values proven in conventional grooved ball bearings and ensures that, depending on the radial bearing play, the spherical disks have a high degree of osculation with their rolling body raceways, even in the case of a permissible skewing of the bearing of 8 to 16 angular minutes out of the center position, and therefore the bearing preserves the full load-bearing capacity.

Finally, in a final preferred embodiment, the contact area of each spherical disk with its rolling body raceways in the inner and in the outer bearing ring is, overall, greater than 45% of the circumference of the basic spherical shape of the spherical disks. Such a large contact area of the spherical disks, which, as a result of all the above-mentioned measures, may amount as an optimum even to virtually 50% of the basic spherical shape of the spherical disks, again corresponds approximately to the contact area which the balls of conventional grooved ball bearings also have with their raceways. In comparison with this, the spherical disks of conventional radial rolling bearings with spherical disks which are mounted by being pushed axially into the clearance between the inner and the outer bearing ring have only a contact area with their rolling body raceways which is smaller than 40% of the basic spherical shape of the spherical disks.

The radial rolling bearing designed according to the invention thus has the advantage, as compared with the radial rolling bearings known from the prior art, that, on the one hand, by the spherical disks being designed with a greater width than the distance between the inner and the outer bearing ring, it has large contact areas between the spherical disks and their raceways in the bearing rings, and, on the other hand, by the spherical disks being inserted into the radial rolling bearing by the eccentric mounting method, with the spherical disks introduced transversely into the raceways, it can at the same time be equipped with a higher number of rolling bodies than conventional single-row grooved ball bearings. As a result, the radial rolling bearing designed according to the invention assimilates the advantages of known radial rolling bearings with spherical disks, as compared with conventional single-grooved ball bearings, namely, a reduced axial construction space, a reduced weight and an increased number of rolling bodies, and the advantages of conventional grooved ball bearings, as compared with known radial rolling bearings with spherical disks, namely, large contact areas between the rolling bodies and their raceways and high axial load-bearing capacity, so that, overall, a markedly increased radial and axial load-bearing capacity of the radial rolling bearing according to the invention, as compared with both known bearings, is obtained.

BRIEF DESCRIPTION OF THE DRAWINGS

A preferred embodiment of the radial rolling bearing designed according to the invention is explained in more detail below with reference to the accompanying drawings in which, in detail:

FIG. 1 shows a side view of a radial rolling bearing designed according to the invention, after mounting, but without a bearing cage;

FIG. 2 shows the cross-section II-II according to FIG. 1 through a radial rolling bearing designed according to the invention;

DETAILED DESCRIPTION OF THE DRAWINGS

Figure 4:
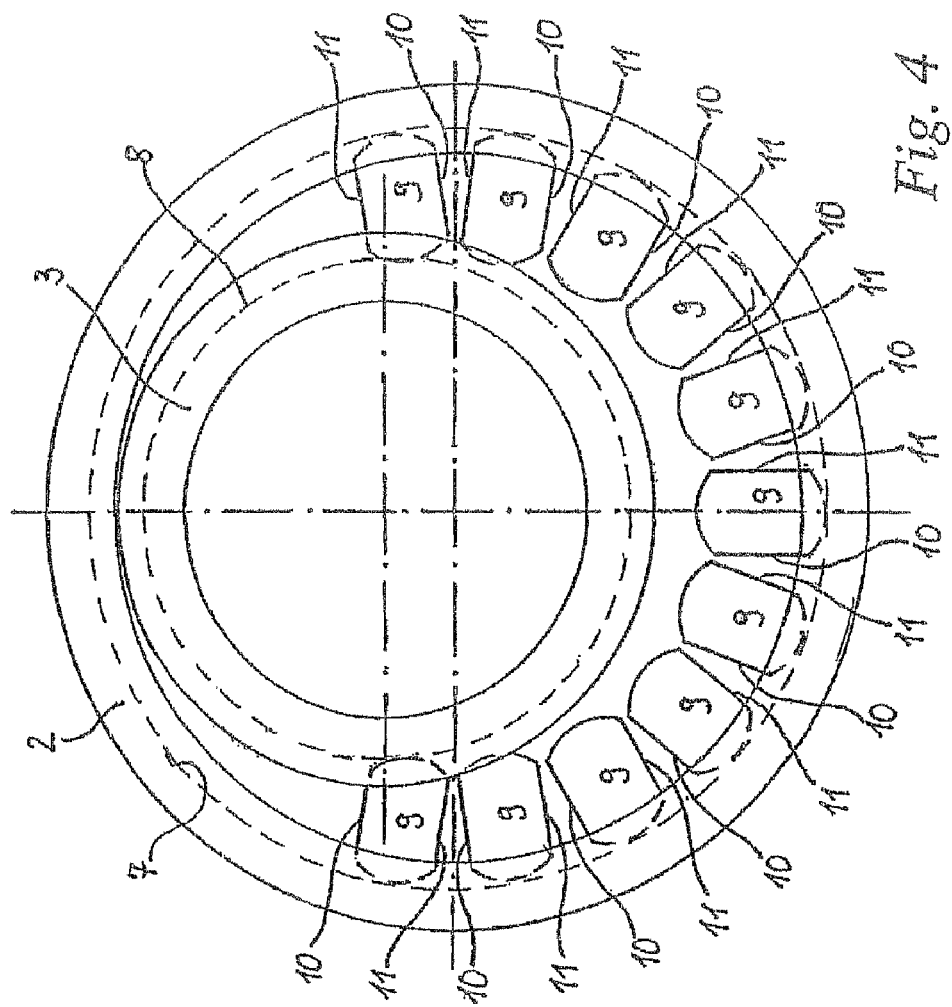
FIG. 4 shows a side view of the radial rolling bearing designed according to the invention, during the eccentric mounting of the spherical disks.

A radial rolling bearing 1 designed as a single-row grooved ball bearing is shown clearly in FIG. 1 and consists essentially of an outer bearing ring 2 and of an inner bearing ring 3 and a number of rolling bodies which are arranged between the bearing rings 2, 3 and are guided at uniform distances from one another by means of the bearing cage 4 indicated in FIG. 2. As is likewise evident from FIG. 2, groove-shaped rolling body raceways 7, 8, adapted in radius to the rolling bodies, are worked into the inside 5 of the outer bearing ring 2 and into the outside 6 of the inner bearing ring 3, while the rolling bodies, as can be seen clearly, are designed as spherical disks 9 with two side faces 10, 11 flattened symmetrically from a basic spherical shape and arranged parallel to one another.

Figure 3:
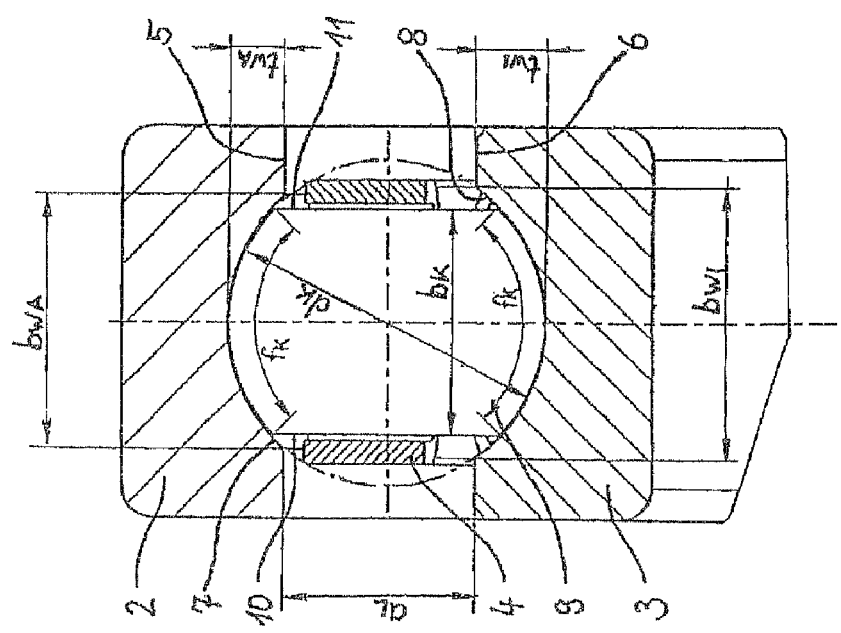
FIG. 3 shows an enlarged illustration of the detail III of the radial rolling bearing designed according to the invention, from FIG. 2.

Furthermore, it can be seen in FIGS. 1 to 3 that the radial rolling bearing 1, in order to increase its load-bearing capacity, is designed, according to the invention, with an enlarged contact area of the spherical disks 9 with their rolling body raceways 7, 8, as compared with known spherical-disk radial rolling bearings, in that the width $b_K$, of the spherical disks 9 between their side faces 10, 11 is greater than the distance $a_L$ between the inside 5 of the outer bearing ring 2 and the outside 6 of the inner bearing ring 3, but is smaller than the width $b_{WT}$, $b_{WA}$ of the groove-shaped rolling body raceways 7, 8. In spite of the fact that, because of this, it is no longer possible to mount the spherical disks 9 axially through the clearance between the outer bearing ring 2 and the inner bearing ring 3, the radial rolling bearing 1 has at the same time, for further increasing its load-bearing capacity, also an increased number of rolling bodies, as compared with known grooved ball bearings, in that, according to the invention, the insertion of the spherical disks 9 into the radial rolling bearing 1 takes place by means of the eccentric mounting method illustrated in FIG. 4, with the spherical disks 9 introduced transversely into the rolling body raceways 7, 8 and bearing with their side faces 10, 11 against one another.

It becomes clear from FIG. 3 that the spherical disks 9 have between their flattened side faces 10, 11 a width $b_K$ which corresponds to about 70% of the diameter $d_K$ of the basic spherical shape, illustrated by dashes and dots in the drawing, of the spherical disks 9. The distance $a_L$ between the inside 5 of the outer bearing ring 2 and the outside 6 of the inner bearing ring 3, by contrast, amounts to only about 64% of the diameter $d_K$ of the basic spherical shape of the spherical disks 9, so that the rolling body raceways 7, 8 of the spherical disks 9 in the bearing rings 2, 3 have high shoulders comparable to conventional grooved ball bearings.

Moreover, it is shown, at least in outlines, in FIG. 3 that, for implementation of a rolling body contact area which even the balls of conventional grooved ball bearings have with their raceways in the bearing rings, the depth $t_{WA}$ of the rolling body raceway 7 in the inside 5 of the outer bearing ring 2 amounts to about 17% of the basic spherical shape of the spherical disk 9, while the depth $t_{WT}$ of the rolling body raceway 8 in the outside 6 of the inner bearing ring 3 is dimensioned at about 19% of the diameter $d_K$ of the basic spherical shape of the spherical disks 9. The width $b_{WA}$ of the rolling body raceway 7 of the inside 5 of the outer bearing ring 2 therefore amounts to about 75% of the diameter $d_K$ of the basic spherical shape of the spherical disk 9, while the width $b_{WT}$ of the rolling body raceway 8 in the outside 6 of the inner bearing ring 3 is dimensioned at about 78% of the diameter $d_K$ of the basic spherical shape of the spherical disk 9. As a result, a contact area, designated in FIG. 3 by $f_K$, of the spherical disks 9 with their rolling body raceways 7, 8 in the inside 5 of the outer bearing ring 2 and in the outside 6 of the inner bearing ring 3, which amounts overall to virtually 50% of the circumference of the basic spherical shape of the spherical disks 9, is obtained.

LIST OF REFERENCE NUMERALS

1 Radial rolling bearing
2 Outer bearing ring
3 Inner bearing ring
4 Bearing cage
5 Inside of 2
6 Outside of 3
7 Rolling body raceway in 5
8 Rolling body raceway in 6
9 Spherical disks
10 Side faces of 9
11 Side faces of 9
$b_K$ Width of the spherical disks
$a_L$ Distance between the bearing rings
$b_{WA}$ Width of the rolling body raceway in 2
$b_{WT}$ Width of the rolling body raceway in 3
$d_K$ Diameter of the basic spherical shape of 9
$t_{WA}$ Depth of the rolling body raceway in 2
$t_{WT}$ Depth of the rolling body raceway in 3
$f_K$ Contact area of the spherical disks

The invention claimed is:

1. A radial rolling bearing, comprising:
an outer bearing ring;
an inner bearing ring;
a number of rolling bodies which are arranged between the outer bearing ring and the inner bearing ring and which are guided at uniform distances from one another by means of a bearing cage;
groove-shaped rolling body raceways on an inside of the outer bearing ring and an outside of the inner bearing ring;
the rolling bodies being spherical disks with two side faces flattened symmetrically from a basic spherical shape and arranged parallel to one another,
wherein the radial rolling bearing has both an enlarged contact area of the spherical disks with the rolling body raceways and an increased number of rolling bodies, a width of the spherical disks between the side faces being greater than a distance between the inside of the outer bearing ring and the outside of the inner bearing ring, but being equal to or smaller than a width of the rolling body raceways, and an insertion of the spherical disks into the radial rolling bearing takes place by an eccentric mounting method, with the spherical disks being introduced transversely into the rolling body raceways and bearing with the side faces against one another,
wherein the width of the spherical disks between the side faces amounts to at least 70% and the distance between the inside of the outer bearing ring and the outside of the inner bearing ring to only about 64% of a diameter of a basic spherical shape of the spherical disks, and
wherein a depth of the rolling body raceway in the inside of the outer bearing ring amounts to about 17% and a death of the rolling body raceway in the outside of the inner bearing ring to about 19% of the diameter of the basic spherical shape of the spherical disks.

2. The radial rolling bearing as claimed in claim 1, wherein the width of the rolling body raceway in the inside of the outer bearing ring amounts to about 75% and the width of the rolling body raceway in the outside of the inner bearing ring to about 78% of the diameter of the basic spherical shape of the spherical disks.

3. The radial rolling bearing as claimed in claim 2, wherein the contact area of the spherical disks with the rolling body raceways in the inside of the outer bearing ring and in the outside of the inner bearing ring is overall greater than 45% of a circumference of the basic spherical shape of the spherical disks.

* * * * *